United States Patent
Jakkahalli et al.

(10) Patent No.: US 7,339,915 B2
(45) Date of Patent: Mar. 4, 2008

(54) VIRTUAL LAN OVERRIDE IN A MULTIPLE BSSID MODE OF OPERATION

(75) Inventors: Padmanabha C. Jakkahalli, Sunnyvale, CA (US); Bhagvan Cheeyandira, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 185 days.

(21) Appl. No.: 11/247,350

(22) Filed: Oct. 11, 2005

(65) Prior Publication Data

US 2007/0081477 A1    Apr. 12, 2007

(51) Int. Cl.
*H04Q 7/24* (2006.01)
(52) U.S. Cl. .................. 370/338; 455/410; 455/411
(58) Field of Classification Search ............... 370/310, 370/338; 455/410, 411; 380/247, 270; 713/168–172
See application file for complete search history.

(56) References Cited

U.S. PATENT DOCUMENTS

| | | | |
|---|---|---|---|
| 5,684,860 | A | 11/1997 | Milani et al. |
| 6,760,318 | B1 | 7/2004 | Bims |
| 6,788,658 | B1 | 9/2004 | Bims |
| 6,925,070 | B2 | 8/2005 | Proctor, Jr. |
| 2002/0022483 | A1 | 2/2002 | Thompson et al. |
| 2002/0188723 | A1 | 12/2002 | Choi |
| 2003/0023746 | A1 | 1/2003 | Loguinov |
| 2003/0188008 | A1 | 10/2003 | Bard |
| 2003/0198206 | A1 | 10/2003 | Koos, Jr. et al. |
| 2004/0248557 | A1 | 12/2004 | Muratsu |
| 2007/0049323 | A1* | 3/2007 | Wang et al. ............... 455/525 |

FOREIGN PATENT DOCUMENTS

WO    WO-2004/013986 A1    2/2004

OTHER PUBLICATIONS

Author unknown, Cisco Enterprise Distributed Wireless Solutions Referenced Network Design, EDCS-466478, Version 2.5, San Jose, California, as downloaded from internet Sep. 15, 2005.
Narasimhan, P. (Aruba Networks), Harkins, D. (Trapeze Networks) and Ponnuswamy, S. (Aruba Networks): "SLAPP: Secure Light Access Point Protocol", The Internet Society (2005), May 31, 2005.
SpectrumSoft Wireless Network Management System, Spectrum 24 Software, publication date Jun. 30, 2000.
PCT Notification of Transmittal of the International Search Report and The Written Opinion of the International Searching Authority dated Sep. 11, 2006, PCT Application No. PCT/US2006/029660.

(Continued)

*Primary Examiner*—Lee Nguyen
(74) *Attorney, Agent, or Firm*—Mark James Spolyar

(57) ABSTRACT

Methods, apparatuses and systems directed to the integration of VLANs and wireless access points operating in a Multiple BSSID mode of operation. According to one implementation of the present invention, a wireless access point dynamically maps an SSID provided by a mobile station to a BSSID based on a VLAN assignment corresponding to the mobile station. In one implementation, the wireless access point learns the correct VLAN/BSSID for a given mobile station, while proxying an authentication session between the mobile station and an authentication server.

24 Claims, 6 Drawing Sheets

OTHER PUBLICATIONS

"tcp-masq" Internet citation http://speed.cis.nctu.edu.tw/bandwith/opensource/, Daa Sheet Cisco Aironet 1200 Series Access Point, pp. 1-13, posted Mar. 11, 2002.

Cisco IOS Configuration Fundamentals Guide *Configuring Cisco Discovery Protocol*, pp. FC-277-FC-280, as downloaded from the internet Sep. 13, 2007.

* cited by examiner

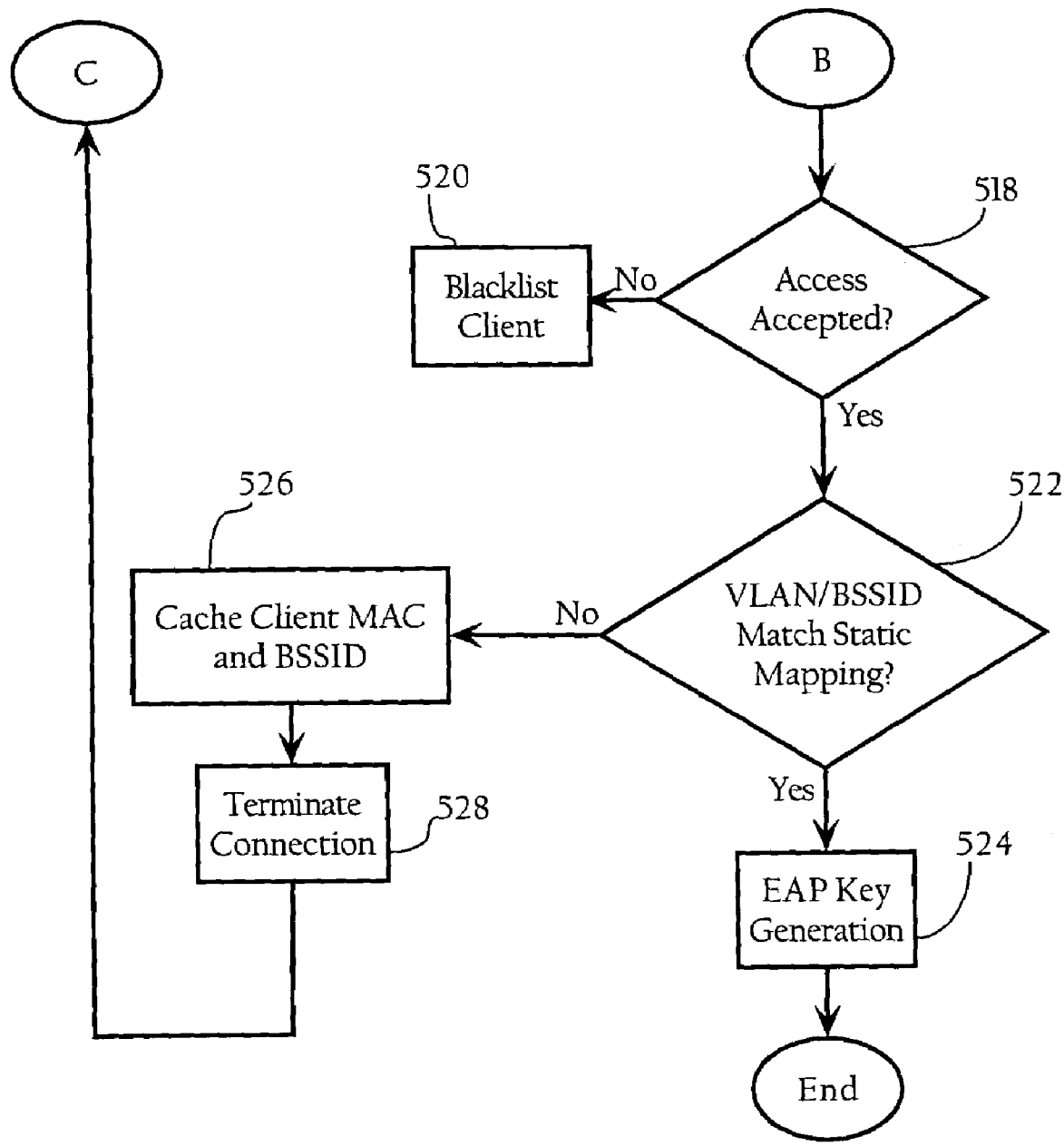
Fig._5B

VIRTUAL LAN OVERRIDE IN A MULTIPLE BSSID MODE OF OPERATION

CROSS-REFERENCE TO RELATED APPLICATIONS AND PATENTS

This application makes reference to the following commonly owned U.S. patent applications and/or patents, which are incorporated herein by reference in their entirety for all purposes:

U.S. patent application Ser. No. 10/407,584, now U.S. Pat. No. 7,212,837, in the name of Patrice R. Calhoun, Robert B. O'Hara, Jr. and Robert J. Friday, entitled "Method and System for Hierarchical Processing of Protocol Information in a Wireless LAN;" and U.S. patent application Ser. No. 11/195,536 in the name of Brian Cox, Bruce McMurdo and Anuradha Gade, entitled "Method and System for Dynamic Assignment of Wireless LAN Access Point Identity."

FIELD OF THE INVENTION

The present invention relates to wireless networks and, more particularly, to methods, apparatuses and systems directed to facilitating integration and use of virtual LANs and wireless access points operating in a multiple BSSID mode of operation.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but also the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

In IEEE 802.11 networks, a service set identifier (SSID) identifies a wireless network to which one or more mobile stations may associate. A mobile station can typically learn the SSID from beacon frames transmitted by wireless access points. Alternatively, a mobile station may be configured with an SSID and broadcast probe requests to find a wireless access point that supports the wireless network corresponding to the SSID. In response to a probe request identifying a given SSID, a wireless access point may transmit a directed probe response frame that includes a basic service set identifier (BSSID), which is a link layer or MAC address of the wireless access point.

Early generation wireless access points typically supported one SSID that mapped to one BSSID. As enterprises began to embrace WLAN technologies, wireless access point began to support multiple SSIDs to allow network administrators to group mobile stations into separate WLANs. In early implementations, the multiple SSIDs mapped to the same BSSID. Since, according to the IEEE 802.11 specification, a beacon frame can only identify one SSID, mobile stations were required to actively probe for access points that supported a desired SSID. Furthermore, given the security issues presented by broadcasting SSID information, many network administrators typically disable broadcasts of SSID information for internal networks, but enabling it for guest access.

Enterprise users also desired to extend their virtual LAN (VLAN) configurations into the wireless domain. To allow enterprises to group wireless clients into different LANs, even though the wireless clients are associated with the same wireless access point, a given SSID was configured to map to a corresponding VLAN. Furthermore, a VLAN trunk link was configured between the wireless access point and a backbone switch. In a VLAN mode, the wireless access point ensures that broadcast/multicast packets transmitted to a group of wireless clients corresponding to one VLAN are not understood by other wireless clients. To achieve this, each VLAN is assigned a group encryption key. As a result, a wireless client with the correct key can decrypt a packet correctly, while other wireless clients outside that VLAN would encounter decryption errors when deciphering the packets.

Static assignment of VLANs to SSIDs can be problematic as it requires the configuration of every wireless client with an SSID that achieves the appropriate VLAN assignment. Accordingly, VLAN override methods were developed to allow users to be automatically grouped by a RADIUS server. Specifically, a RADIUS or other authentication server is configured to assign a VLAN to a wireless client after a successful EAP authentication. Depending on the VLAN identified by the RADIUS server, the wireless access point can then provide the appropriate group encryption key.

Wireless network administrators began to notice that the use of a single BSSID for all VLANs resulted in increased decryption errors and wasted battery power on the wireless clients. To address this problem, wireless access points were developed to support multiple BSSIDs (MBSSID). According to this methodology, each VLAN maps to a corresponding BSSID and group encryption key. The MBSSID solution addressed decryption errors, since a wireless client drops any packet that does not have the correct BSSID prior to decryption. This also conserves battery power as no computing resources are spent trying to decrypt wireless frames that are not transmitted from the BSSID to which the wireless client is associated.

The implementation of MBSSIDs, however, became problematic to the use of RADIUS servers for VLAN override. As discussed above, VLAN assignment occurs at the end of an EAP authentication. To authenticate to a RADIUS server, a wireless client must first associate with a BSSID; however, the BSSID to which the wireless client may first associate may not correspond to the VLAN to which the wireless client is ultimately assigned during EAP authentication. Indeed, if the assigned VLAN does not correspond to the current BSSID, the wireless client must associate to the BSSID that matches the VLAN assignment. IEEE 802.11 WLANs, however, do not support a mechanism that allows a wireless client to change a BSSID after EAP authentication.

One possible solution to this problem is to disable the VLAN override and configure the appropriate SSID on each wireless client, where the appropriate SSID is mapped to the appropriate BSSID, which is mapped to the assigned VLAN. This allows the grouping of wireless clients per VLAN, reduces broadcast traffic, and results in power savings for hand-held wireless clients. One disadvantage of this, however, is that the administrator must make sure to configure each wireless client with the correct SSID. Also, the administrator cannot change the VLAN configuration on the backbone without changing the wireless client configuration. Also, the NAC cannot be supported as the VLAN assignment changes dynamically.

A second possible solution is to duplicate broadcast packets to multiple BSSIDs. The disadvantage of this is that it increases decrypt errors at the wireless clients and also decreases the battery life of hand-held wireless clients, which defeats the purpose of MBSSID.

In light of the foregoing, a need in the art exists for methods, apparatuses, and systems that address the foregoing problems and facilitate integration of MBSSID modes of operation with VLAN override. Embodiments of the present invention substantially fulfill this need.

DESCRIPTION OF THE DRAWINGS

FIGS. 5A and 5B, together, illustrate the process flow associated with authentication of a wireless client according to one implementation of the present invention.

DESCRIPTION OF PREFERRED EMBODIMENT(S)

A. Overview

The present invention provides methods, apparatuses and systems directed to the integration of VLANs and wireless access points operating in a Multiple BSSID mode of operation. According to one implementation of the present invention, a wireless access point implements a VLAN override mechanism to control access to particular domains of a wireless network. In one implementation, there is a one-to-one mapping between VLANs and the BSSIDs corresponding to a wireless access point operating in an MBSSID mode. Conventionally, wireless access points maintain a similar, statically defined one-to-one mapping between a given SSID and a BSSID. As discussed in more detail below, however, the wireless access point dynamically maps an SSID provided by a mobile station in a probe request to a BSSID/VLAN to which a mobile station has been assigned by a network administrator or other user. In one implementation, the wireless access point learns the correct VLAN/BSSID for a given mobile station, while proxying an authentication session between the mobile station and an authentication server. If the current BSSID to which the mobile station has associated does not map to the correct VLAN identifier, the wireless access point caches the BSSID/VLAN in association with an identifier for the mobile station (e.g., MAC address) and terminates the connection with the mobile station. The mobile station transmits a probe request to which the wireless access point responds with a probe response that identifies the BSSID previously cached for the mobile station. As a result, the wireless network maintains the advantages of both MBSSID mode of operation and advantages of VLAN override, while also avoiding decryption errors and increasing the battery life of hand-held wireless clients.

B. Exemplary Wireless Network System Architecture

B.1. Network Topology

Figure 1:
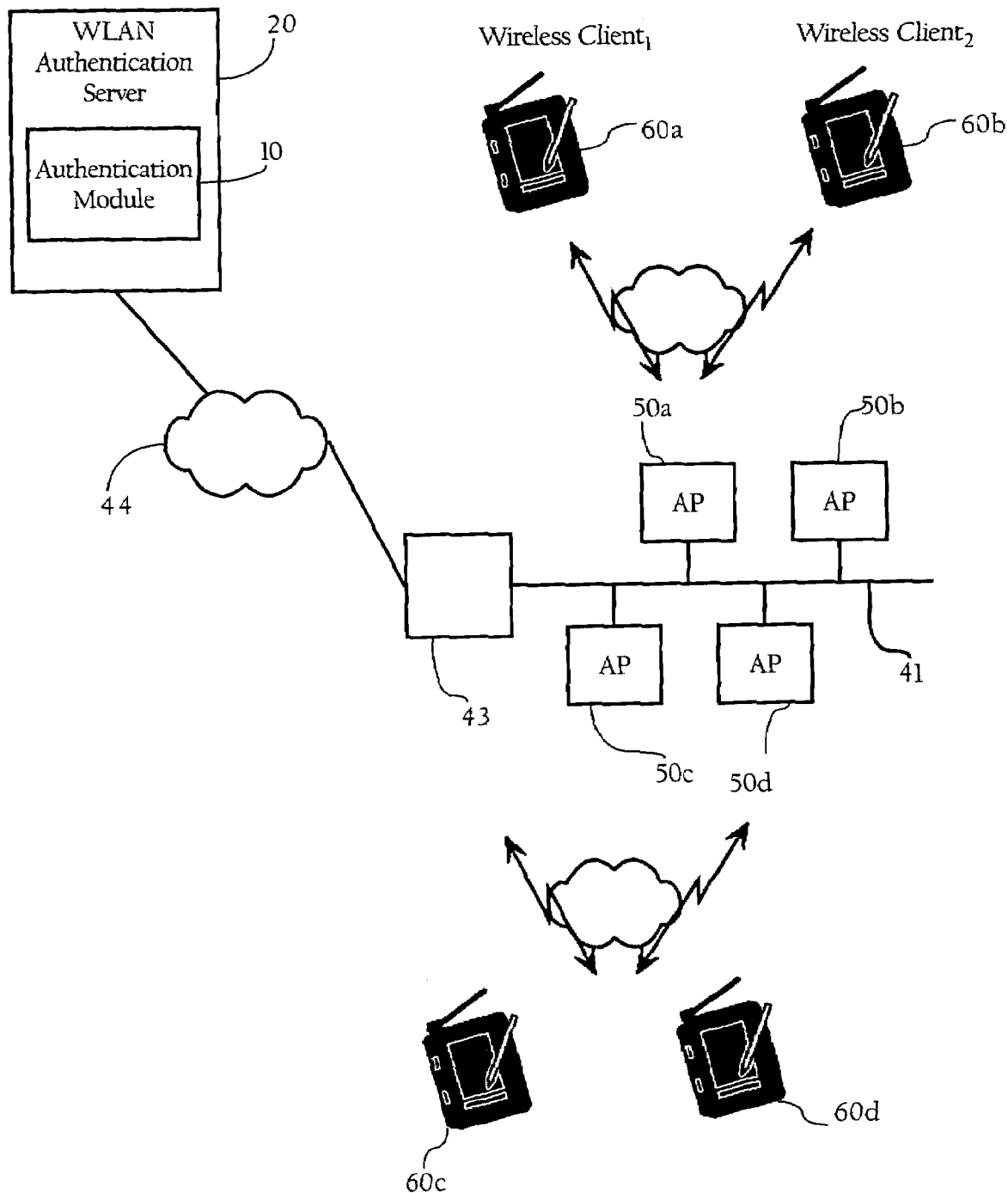
FIG. 1 is a topological diagram of the components in a wireless local area network system according to one embodiment of the present invention.

A network environment implementing virtual LANs (VLANs) according to one implementation of the present invention is shown in FIG. 1. In a specific embodiment of the present invention, the system includes an authentication module 10 running on a WLAN authentication server 20, a router 43, a local area network (LAN) 41, and wireless access points 50a, 50b, 50c, and 50d (collectively referred to as wireless access points 50). LAN 41 is implemented by a switch (or an array of switches) and/or other network devices, such as a bridge. The network devices implementing the LAN support a plurality of virtual LANs (VLANs). A VLAN is a switched network that is logically segmented by one or more criteria without regard to the physical location of the end stations. For example, end stations might be grouped according to company departments, such as engineering or accounting rather than their physical locations. Multiple VLANs can be defined over the same network infrastructure to segment a LAN to different broadcast domains. The IEEE 802.1Q standard, entitled "Virtual Bridged Local Area Networks," sets forth a VLAN implementation in common use today.

As described in more detail below, in one implementation, WLAN authentication server 20 comprises authentication module 10 which may be a RADIUS server, but may be any other type of authentication server. As FIG. 1 illustrates, these network elements are operably connected to a network 44. Network 44, in one implementation, generally refers to a computer network, such as a LAN, a WAN, etc., that includes one or more intermediate network devices (e.g., routers, switches, etc.), which allow for the transmission of messages between WLAN authentication server 20 and wireless access points 50. Of course, network 44 can include a variety of network segments, transmission technologies and components, such as terrestrial WAN links, satellite links, and cellular links. Network 41 may be a LAN or LAN segments implemented by an Ethernet switch (not shown) or an array of switches having multiple ports to which wireless access points 50 are connected. The wireless access points 50 are typically connected to the switch ports via Ethernet links; however, other link layer connection protocols or communication means can be employed. FIG. 1 illustrates one possible network environment in which the invention may operate; however, other implementations are possible. For example, although WLAN authentication server 20 is illustrated as being on a different LAN or LAN segment, it may be co-located with wireless access points 50.

The wireless access points 50 are operative to wirelessly communicate with remote wireless client devices 60a, 60b, 60c, and 60d. In one implementation, the wireless access points 50 implement the wireless network protocol specified in the IEEE 802.11 WLAN specification. The wireless access points 50 may be autonomous or so-called "fat" wireless access points, or light-weight wireless access points operating in connection with a wireless switch (not illustrated), as disclosed in U.S. patent application Ser. No. 10/407,584, now U.S. Pat. No. 7,212,837. In addition, the network infrastructure may also include a Wireless LAN Solution Engine (WLSE) offered by Cisco Systems, Inc. of San Jose, Calif. or other wireless network management system. Furthermore, U.S. patent application Ser. No. 11/195,536 discloses methods and systems for automatically assigning an identity to, and configuring, the wireless access points 50. Of course, configuration and management information can be obtained in a variety of manners without departing from the scope of the present invention.

In one implementation, the wireless clients and the wireless network infrastructure, including the wireless access points 50 and authentication module 10, implement a security mechanism to encrypt and secure wireless communications. In one implementation, the wireless clients and the wireless network infrastructure employ a network access protocol, such as the IEEE 802.1X standard, which is based on the Extensible Authentication Protocol (EAP). This protocol provides an authentication framework that supports methods for authenticating and authorizing network access for the wireless clients. Still further, in one implementation, the wireless clients and the wireless network infrastructure implement the security and encryption mechanisms specified in the IEEE 802.11i specification. As discussed below, the encryption mechanisms, in one implementation, involve the generation and use of Pairwise Master Keys and Pairwise Transient Keys. In one implementation, a pairwise master key is a code or string derived from a master secret, and is used to derive a Pairwise Transient Key (PTK). Accordingly, a Pairwise Transient Key is a value string derived from a pairwise master key (PMK). According to the IEEE 802.11i specification, the PTK is split into multiple encryption keys and message integrity code (MIC) keys for use by a wireless client and the wireless network infrastructure as temporal session keys. Other encryption and security mechanisms can also be used, such as the PPP protocol.

Authentication module 10, in one implementation, is operative to authenticate wireless users to allow access to network resources available through wireless access points 50. In one implementation, authentication module 10 implements Remote Authentication Dial In User Service (RADIUS) functionality, as disclosed in RFCs 2138, 2865, and 2866. As described more fully below, when a wireless client attempts to connect to the wireless network, the access point 50 proxies the authentication session between the wireless client and authentication module 10. The authentication module 10, as discussed below, is configured to support VLAN override operations by returning a VLAN assignment for a given wireless client upon successful authentication. For didactic purposes, assume that a network administrator has configured LAN 41 to support two VLANs (VLAN1 & VLAN2). Further assume that the network administrator has configured each wireless access point 50 to operate in MBSSID mode with a default mapping between a given BSSID and an SSID. For example, $BSSID_1$ maps to $SSID_1$, while $BSSID_2$ maps to $SSID_2$. Still further, assume that the network administrator has configured each wireless access point 50 to map a given VLAN to a given BSSID. For example, $BSSID_1$ corresponding to wireless access point 50a maps to $VLAN_1$, while $BSSID_2$ corresponding to wireless access point 50a maps to $VLAN_2$. Furthermore, as described herein, a network administrator may use the VLAN and MBSSID functionality to separate broadcast domains (i.e., VLANs) and to separate traffic among different groups of wireless clients. For example, one group (e.g., wireless clients 60a and 60d) may be associated with a given department (e.g., engineering) and another group (e.g., wireless clients 60b and 60c) may be associated with another department (e.g., marketing). Accordingly, a network administrator may assign certain users to $VLAN_1$ and other users to $VLAN_2$. In one implementation, this VLAN assignment information is maintained in a data store accessible to authentication module 10. In one implementation, wireless users are identified by a user name. However, wireless users can be identified by any suitable identification, such as the MAC address of a wireless client 60, or in connection with a digital certificate. In one implementation, authentication module 10, after a user has been authenticated, returns to wireless access point 50 the VLAN identifier associated with the user. As discussed more fully below, the wireless access point 50 is operative to enforce this VLAN assignment by selectively terminating the connection with the wireless client if the BSSID to which the wireless client is associated does not correspond to the VLAN assignment.

B.2. WLAN Authentication Server

Figure 2:
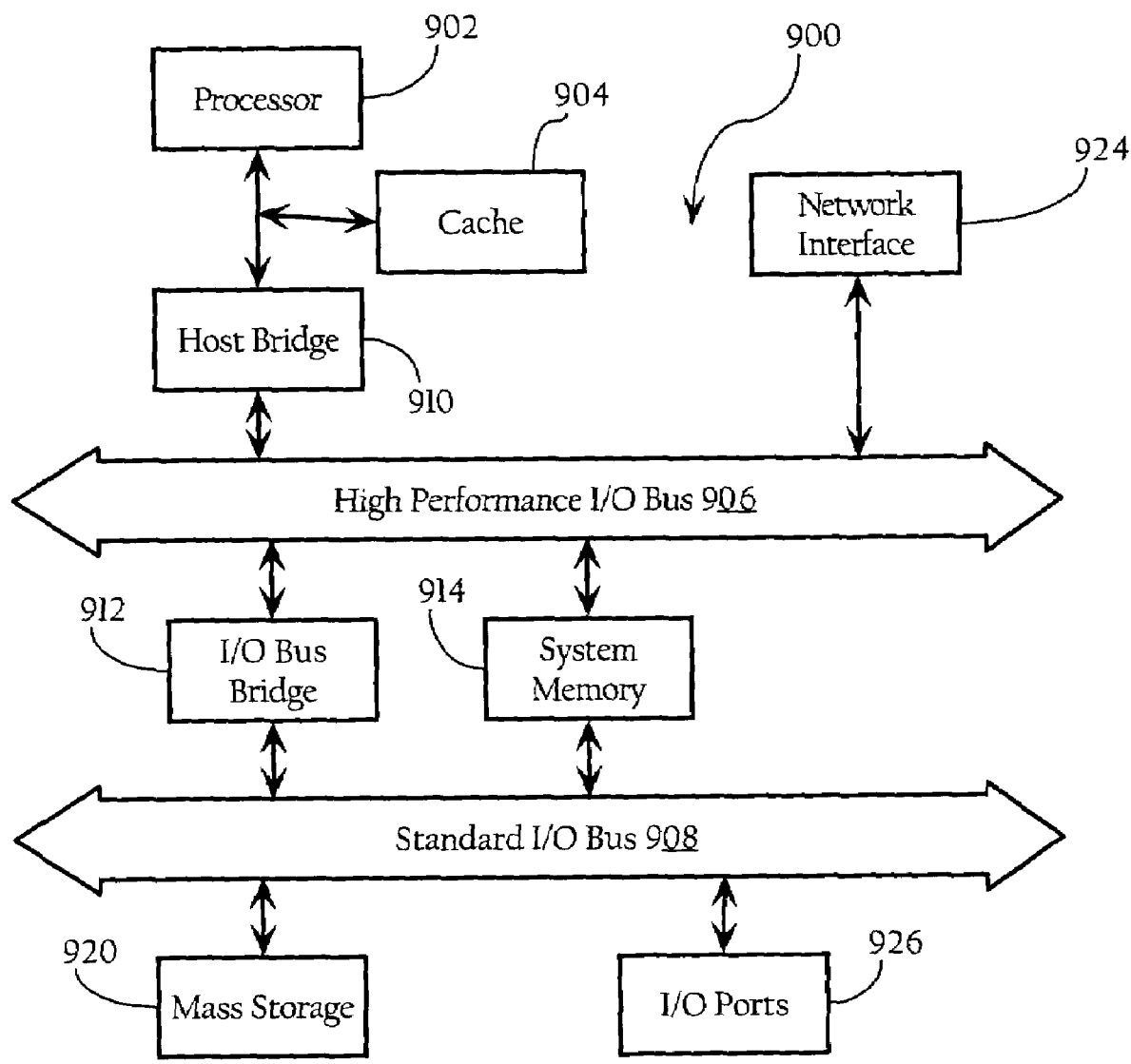
FIG. 2 is a functional block diagram illustrating the components of a wireless local area network authentication server in accordance with one embodiment of the present invention.

FIG. 2 illustrates for didactic purposes a hardware system 900, which may be used to implement the WLAN authentication server 20 of FIG. 1. In one implementation, hardware system 900 comprises a processor 902, a system memory 914, a network interface 924, and one or more software applications (including the authentication module 10 shown in FIG. 1) and drivers enabling the functions described herein.

The present invention can be implemented on a wide variety of computer system architectures. For example, FIG. 2 illustrates a hardware system 900 having components suitable for WLAN authentication server 20 of FIG. 1, in accordance with another implementation of the present invention. In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interface 924, and system memory 914. The hardware system may further include video memory (not shown) and a display device coupled to the video memory. Coupled to bus 908 are mass storage 920 and I/O ports 926. The hardware system 900 may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of hardware system 900 perform their conventional functions known in the art. In particular, network interface 924 is used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the present invention may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the WLAN authentication server 20 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902.

An operating system manages and controls the operation of hardware system 900, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

B.3. Access Point

Figure 3:
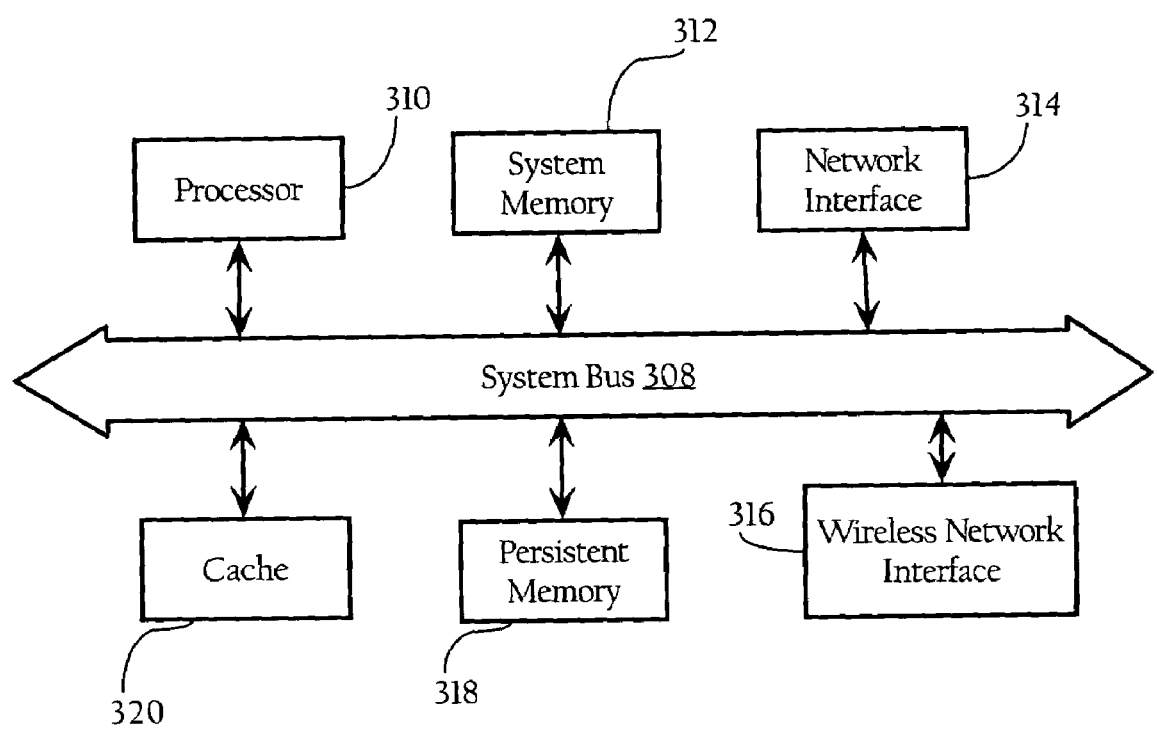
FIG. 3 is a functional block diagram illustrating the components of an access point in accordance with one embodiment of the present invention.

FIG. 3 illustrates for didactic purposes an wireless access point, which can be used to implement an wireless access point of FIG. 1. In one implementation, the wireless access point comprises a processor 310, a memory 312, a network interface 314 (e.g., an 802.3 interface) for communication with a LAN, a wireless network interface 316 (e.g., an IEEE 802.11 WLAN interface) for wireless communication with one or more wireless clients 60, a persistent memory 318, a cache 320 for storing VLAN information, and a system bus 308 interconnecting these components. The wireless access points 50 may also include software modules (including DHCP clients, Cisco® Discovery Protocol (CDP) modules, wireless access point modules, SNMP functionality, etc.) and device drivers (e.g., network and WLAN interface drivers) stored in the persistent memory 318 (e.g., a hard disk drive, flash memory, etc.). At start up, these software components are loaded into memory 312 and then accessed and executed by processor 310.

C. VLAN Override of SSID-to-BSSID Default Mapping

Figure 4:
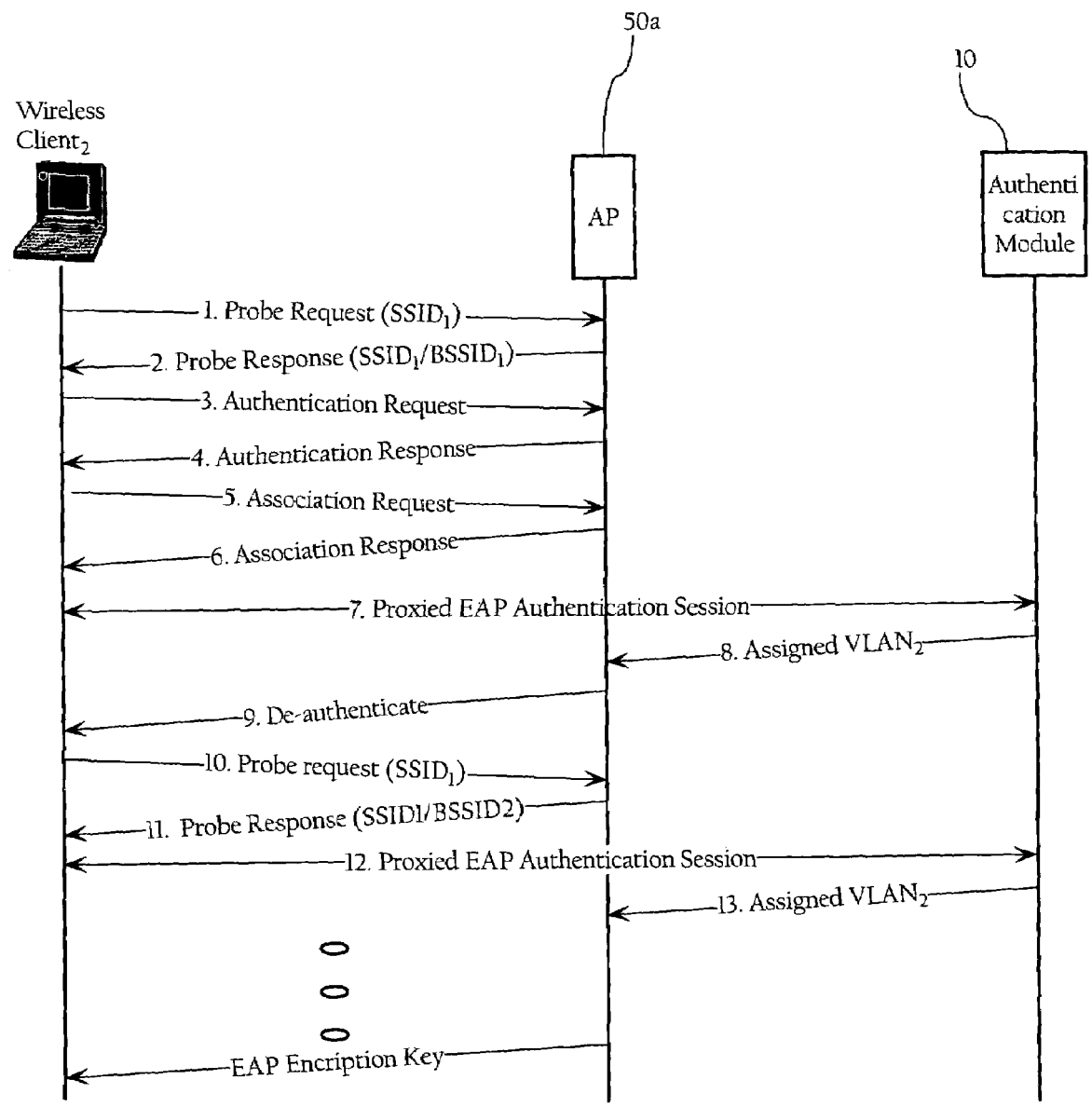
FIG. 4 is a diagram illustrating information flow among a wireless client, an access point, and a wireless local area network authentication server in accordance with one implementation of the present invention.

FIG. 4 is a diagram illustrating a possible message flow among a wireless client, an access point 50a, and authentication module 10 in accordance with one implementation of the present invention. FIG. 4 illustrates one implementation where a wireless client (e.g., wireless client 60a, also referred to as wireless client$_1$ for illustrative purposes) from one group (e.g., engineering) is assigned to a particular VLAN (e.g., VLAN$_1$). Similarly, a wireless client (e.g., wireless client 60b, also referred to as wireless client$_2$) from another group (e.g., marketing) is assigned to another VLAN (e.g., VLAN$_2$). As discussed above, in one implementation, a given wireless access point is configured to support two SSIDs, each of which maps by default to corresponding BSSIDs. As discussed above, each wireless access point also maps a given BSSID to a corresponding VLAN. For example, SSID$_1$ may be mapped to BSSID$_1$, which is mapped to VLAN$_1$ (or SSID$_1$/BSSID$_1$/VLAN$_1$). Similarly, SSID$_2$ may be mapped to BSSID$_2$, which is mapped to VLAN$_2$ (or SSID$_2$/BSSID$_2$/VLAN$_2$). As discussed in more detail below, however, each wireless access point may dynamically change, for a given wireless client, the mapping between an SSID provided by a wireless client and a corresponding BSSID based on VLAN assignment information provided by authentication module 10.

Figure 5A:
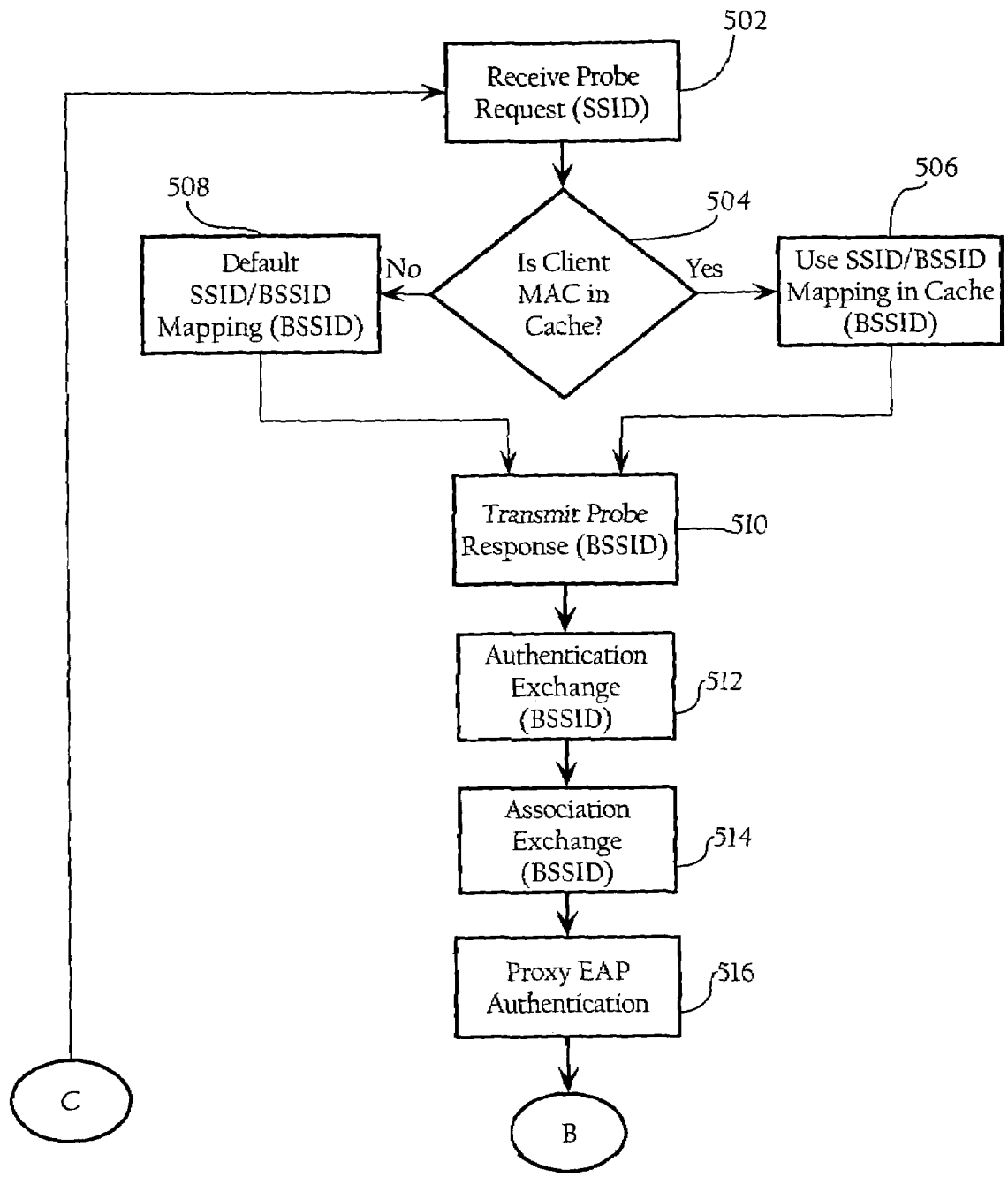

FIGS. 5A and 5B, together, illustrate the process flow, according to one implementation of the present invention, executed by a wireless access point in connection with establishing wireless access for a wireless client. Referring to FIGS. 4, 5A, and 5B together, if the wireless client$_2$ attempts to access the wireless network, the wireless client$_2$ broadcasts a probe request to discover an wireless access point. In one implementation, the SSID used by the wireless client may be manually configured by an administrator or other user. In one implementation, the wireless client may discover a SSID in beacon frames transmitted by wireless access point. As FIG. 4 illustrates, wireless client$_2$ has been configured with SSID$_1$ and transmits/broadcasts a probe request in an attempt to discover a wireless access point that supports the identified SSID. A wireless access point (e.g., wireless access point 50a) configured to support the identified SSID (i.e., SSID$_1$) responds to the probe request (502). The wireless access point then determines if the MAC address (or other suitable identifier) of the wireless client$_2$ is stored in a cache that maintains a mapping between wireless clients (by MAC address) and corresponding BSSIDs/VLANs (504). As FIG. 5A shows, if the cache contains the MAC address of the wireless client$_2$, the wireless access point retrieves the BSSID associated with that MAC address in the cache (506). Otherwise, the wireless access point uses the default SSID/BSSID mapping to return the BSSID corresponding to the SSID in the probe request transmitted by the wireless client (508). Accordingly, in this didactic example, if the probe request identifies SSID$_1$ and the cache does not contain the MAC address of wireless client$_2$, the wireless access point uses by default BSSID$_1$. The wireless access point then responds by sending a directed probe response (including either the default or cached BSSID) to the wireless client$_2$ (510). In the didactic message flow illustrated in FIG. 4, the cache did not contain the MAC address of wireless client$_2$; therefore, wireless access point 50a returned BSSID$_1$ in the directed probe response.

As illustrated in FIGS. 4 and 5A, the wireless client$_2$ and the access point 50a exchange authentication frames (512). In one implementation, access point 50a implements an open systems authentication during which the wireless client$_2$ transmits an authentication request frame and the wireless access point sends an authentication response frame. Next, during an association phase (514), the wireless access point receives from the wireless client$_2$ an association request frame and then sends an association response frame to the wireless client$_2$.

As discussed below, after the wireless client and the access point establish a wireless link layer connection, the wireless access point then proxies an authentication session between the wireless client and authentication module 10

(516). In one implementation, the authentication session is based on the IEEE 802.1x authentication framework that uses the Extensible Authentication Protocol (EAP) as the authentication process between the wireless client (supplicant) and the authentication module 10. Different EAP types include Message Digest 5 (MD5)-Challenge, and Transport Layer Security (TLS). In one implementation, EAP-TLS is used as the authentication protocol. In implementations where authentication module 10 is a RADIUS server, the wireless access point, in one implementation, acts as a RADIUS client to the RADIUS server (authentication module), and acts as the authenticator to the wireless client (supplicant STA). In addition, user credentials and parameters of a connection request are sent as a series of RADIUS request messages. In one implementation, authentication module 10 receives a user-connection request and authenticates the wireless client against its authentication database. As discussed above, authentication module 10 can also maintain a central storage database of other relevant user properties. For example, in addition to a basic accept or reject response to an authentication request, authentication module 10 can provide other network access or connection parameters for a wireless client or user—such as VLAN assignment, maximum session time, static IP address assignment, and so on. In the didactic example of FIG. 4, authentication module 10 returns network access information including a VLAN assignment of $VLAN_2$.

As FIG. 5B provides, if authentication module 10 does not accept the request for access by wireless client 2 (518), the wireless access point 50a, in one implementation, blacklists the $wireless client_2$ from access to the wireless network (520). If access is accepted, however, the wireless access point 50a determines whether the BSSID to which the wireless client is currently associated matches the VLAN identifier in the VLAN assignment information returned by authentication module 10 (522). In the didactic example, wireless client 2 is currently associated with $BSSID_1$ based on the default mapping of $SSID_1$ to $BSSID_1$. Accordingly, the VLAN assignment (here, $VLAN_2$) does not match the current BSSID to which the wireless client is connected. As FIG. 5B shows, if the current BSSID does not match the VLAN, the wireless access point caches the MAC address of the $wireless client_2$ in association with the appropriate BSSID that corresponds to the VLAN assignment returned by authentication module 10 (526). The wireless access point 50a then terminates the connection with the wireless client 60a (528). In 802.11 implementations, the wireless access point transmits a de-authentication frame to terminate the wireless connection. The wireless access point saves the MAC address in the cache for a predetermined amount of time in the event the wireless client attempts to access the wireless network via that wireless access point in a future session. Next, the wireless access point de-authenticates the $wireless client_2$ from the initial $VLAN_1$ (528). If the BSSID were to match the assigned VLAN, the wireless access point generates an EAP encryption key corresponding to the assigned VLAN (524), if an EAP encryption key does not already exist. If an EAP encryption key already exists, subsequent wireless clients reuse that the previously generated key. As noted above, the wireless access point generates a separate EAP encryption key for each VLAN.

Termination of the wireless connection causes wireless client 60a, in one implementation, to again broadcast probe requests identifying (SSID1). When the wireless access point receives the probe request (502), the wireless access point determines whether the cache includes network access information for the wireless client (504). In the didactic scenario illustrated in FIG. 4, the wireless access point 50 locates the MAC address corresponding to the wireless client and returns $BSSID_2$ (which maps $VLAN_2$) to in a probe response. Thereafter, the wireless client 60a and access point 50a complete an open systems authentication and wireless connection handshake, as set forth above. The access point 50a then proxies an authentication session as discussed above. However, since the VLAN assignment information returned by authentication module matches the BSSID to which the wireless client is associated, the access point 50a and the wireless client exchange messages to generate encryption keys 524.

Embodiments of the present invention minimize decryption errors, because the wireless client receives an EAP encryption key after the EAP authentication stage is completed. This ensures that the wireless client attempts to decrypt an EAP encryption key for the appropriate VLAN. This also increases the battery life for hand-held wireless clients.

The invention has been explained with reference to specific embodiments. For example, while embodiments of the present invention have been described as operating in connection with IEEE 802.11 networks, the present invention can be used in connection with any WLAN environment. Other embodiments will be evident to those of ordinary skill in the art. It is therefore not intended that the invention be limited except as indicated by the appended claims.

What is claimed is:

1. In a wireless access point operative to support a plurality of Basic Service Set Identifiers (BSSIDs), each of the BSSIDs mapping by default to a corresponding Service Set Identifier (SSID), and to bridge wireless frames onto a network implementing a plurality of virtual networks, wherein each BSSID maps to a corresponding virtual network, a method comprising:
   establishing a wireless connection, corresponding to a first BSSID, with a wireless client;
   accessing a cache of network access information, wherein the network access information for a given wireless client identifies a corresponding BSSID;
   using, if the wireless client is identified in the cache, the corresponding BSSID as the first BSSID;
   otherwise using a default BSSID as the first BSSID;
   receiving, from a remote node connected to the network, network access information for the wireless client, wherein the network access information comprises information identifying a virtual network;
   storing the received network access information in the cache; and
   if the virtual network identified in the network access information does not map to the first BSSID, terminating the wireless connection with the wireless client.

2. The method of claim 1 further comprising
   transmitting, to the wireless client, the first. BSSID in response to a request.

3. The method of claim 1 further comprising
   proxying an authentication session between the wireless client and the remote node, wherein the remote node transmits the network access information upon a successful authentication.

4. The method of claim 1 wherein the remote node is an authentication server.

5. The method of claim 1 wherein the SSID is manually provided.

6. The method of claim 1 wherein the SSID is discovered in beacon frames transmitted by the wireless client.

7. The method of claim 1 further comprising
transmitting a de-authentication frame to the wireless client if the first BSSID does not map to the identified virtual network.

8. The method of claim 1 further comprising
generating one or more session keys with the wireless client, if the first BSSID maps to the identified virtual network.

9. In a wireless access point operative to support a plurality of Basic Service Set Identifiers (BSSIDs), each of the BSSIDs mapping by default to a corresponding Service Set Identifier (SSID), and to bridge wireless frames onto a network implementing a plurality of virtual networks, wherein each BSSID maps to a corresponding virtual network, a method comprising
receiving, from a wireless client, a probe request identifying a first SSID;
accessing a cache of network access information to dynamically map the SSID to either a default BSSID or a BSSID stored in the cache in association with the wireless client;
providing the mapped BSSID to the wireless client;
proxying an authentication session between the wireless client and an authentication server, wherein the authentication server is operative to identify a virtual network corresponding to the wireless client, wherein the identified virtual network maps to a first BSSID;
comparing the first BSSID to the mapped BSSID;
storing, in the cache, the first BSSID in association with the wireless client; and
terminating a connection with the wireless client, if the first BSSID does not match the mapped BSSID.

10. The method of claim 9 wherein the wireless access point learns the correct VLAN/BSSID for a given wireless client, while proxying an authentication session between the wireless client and the remote node.

11. The method of claim 10 wherein the remote node is an authentication server.

12. The method of claim 9 wherein the SSID is manually provided.

13. The method of claim 9 wherein the SSID is discovered in beacon frames transmitted by the wireless access point.

14. The method of claim 9 further comprising
transmitting a de-authentication frame to the wireless client if the first BSSID does not map to the identified virtual network.

15. The method of claim 10 further comprising
generating one or more session keys with the wireless client, if the BSSID maps to the identified virtual network.

16. An apparatus operative to support a plurality of Basic Service Set Identifiers (BSSIDs), each of the BSSIDs mapping by default to a corresponding Service Set Identifier (SSID), and to bridge wireless frames onto a network implementing a plurality of virtual networks, wherein each BSSID maps to a corresponding virtual network, the apparatus comprising:
one or more processors;
a memory;
an authentication application, physically stored in the memory, comprising instructions operable to cause the one or more processors and the apparatus to
establish a wireless connection, corresponding to a first BSSID, with a wireless client;
access a cache of network access information, wherein the network access information for a given wireless client identifies a corresponding BSSID;
use the corresponding BSSID as the first BSSID, if the wireless client is identified in the cache, otherwise use a default BSSID as the first BSSID;
receive, from a remote node connected to the network, network access information for the wireless client, wherein the network access information comprises information identifying a virtual network;
store the received network access information in the cache; and
if the virtual network identified in the network access information does not map to the first BSSID, terminate the wireless connection with the wireless client.

17. The apparatus of claim 16 wherein the authentication application further comprises instructions operable to cause the one or more processors and the apparatus to
transmit, to the wireless client, the first BSSID in response to a request.

18. The apparatus of claim 16 wherein the authentication application further comprises instructions operable to cause the one or more processors and the apparatus to
proxy an authentication session between the wireless client and the remote node, wherein the remote node transmits the network access information upon a successful authentication.

19. The apparatus of claim 16 wherein the remote node is an authentication server.

20. The apparatus of claim 16 wherein the SSID is manually provided.

21. The apparatus of claim 16 wherein the SSID is discovered in beacon frames transmitted by the wireless client.

22. The apparatus of claim 16 wherein the authentication application further comprises instructions operable to cause the one or more processors and the apparatus to
transmit a de-authentication frame to the wireless client if the first BSSID does not map to the identified virtual network.

23. The apparatus of claim 16 wherein the authentication application further comprises instructions operable to cause the one or more processors and the apparatus to
generate one or more session keys with the wireless client, if the first BSSID maps to the identified virtual network.

24. An apparatus operative to support a plurality of Basic Service Set Identifiers (BSSIDs), each of the BSSIDs mapping by default to a corresponding Service Set Identifier (SSID), and to bridge wireless frames onto a network implementing a plurality of virtual networks, wherein each BSSID maps to a corresponding virtual network, the apparatus comprising:
means for establishing a wireless connection, corresponding to a first BSSID, with a wireless client;
means for accessing a cache of network access information, wherein the network access information for a given wireless client identifies a corresponding BSSID;
means for using, if the wireless client is identified in the cache, the corresponding BSSID as the first BSSID, otherwise, said means using a default BSSID as the first BSSID;

means for receiving, from a remote node connected to the network, network access information for the wireless client, wherein the network access information comprises information identifying a virtual network;

means for storing the received network access information in the cache; and if the virtual network identified in the network access information does not map to the first BSSID, means for terminating the wireless connection with the wireless client.

* * * * *